United States Patent
Wu et al.

(12) United States Patent (10) Patent No.: US 12,273,020 B2
(45) Date of Patent: Apr. 8, 2025

(54) METHOD AND DEVICE FOR CONTROLLING BUCK CONVERTER AND CHIP

(71) Applicant: Shanghai Hanmai Electronic Technology Co., Ltd, Shanghai (CN)

(72) Inventors: Xiaohui Wu, Shanghai (CN); Lilong Wang, Shanghai (CN)

(73) Assignee: Shanghai Hanmai Electronic Technology Co., Ltd, Shanghai (CN)

( * ) Notice: Subject to any disclaimer, the term of this patent is extended or adjusted under 35 U.S.C. 154(b) by 283 days.

(21) Appl. No.: 18/095,988

(22) Filed: Jan. 11, 2023

(65) Prior Publication Data

US 2023/0246537 A1    Aug. 3, 2023

(30) Foreign Application Priority Data

Jan. 11, 2022   (CN) .......................... 202210028500.0

(51) Int. Cl.
*H02M 1/00* (2007.01)
*H02M 3/158* (2006.01)

(52) U.S. Cl.
CPC ....... *H02M 1/0058* (2021.05); *H02M 1/0009* (2021.05); *H02M 3/1584* (2013.01); *H02M 3/1588* (2013.01)

(58) Field of Classification Search
CPC ............. H02M 1/0058; H02M 1/0009; H02M 3/1584; H02M 3/1588; H02M 1/088
See application file for complete search history.

(56) References Cited

U.S. PATENT DOCUMENTS 9,467,049 B2 * 10/2016 Ju .......................... H02M 3/158
2018/0041116 A1 * 2/2018 Oh .......................... H02M 1/14

* cited by examiner

*Primary Examiner* — Adolf D Berhane
*Assistant Examiner* — Afework S Demisse
(74) *Attorney, Agent, or Firm* — IPRTOP LLC (57) ABSTRACT

A method for controlling a buck converter is provided. The method includes monitoring an inductor current flowing through an inductor in the buck converter. The method includes controlling the buck converter to operate in a pulse frequency modulation (PFM) mode with intermittent conduction if the inductor current experiences a plurality of cross-zero periods. The method further includes adjusting a power consumption of a component in the buck converter according to the plurality of cross-zero periods of the inductor current, when the buck converter is operating in the PFM mode.

20 Claims, 5 Drawing Sheets

METHOD AND DEVICE FOR CONTROLLING BUCK CONVERTER AND CHIP

CROSS REFERENCE TO RELATED APPLICATION

The present application claims the benefit of priority to Chinese Patent Application No. CN 2022100285000, entitled "Method and Device for Controlling Buck Converter and Chip", filed with CNIPA on Jan. 11, 2022, the disclosure of which is incorporated herein by reference in its entirety for all purposes.

FIELD OF TECHNOLOGY

The present disclosure generally relates to the field of converters, and in particular to method and device for controlling buck converter and chip.

BACKGROUND

A Buck Converter may be a DC-DC converter used for voltage reduction, so that the voltage at the converter's output (load) side is lower than the voltage at the converter's input (power) side. Buck converters are commonly used in power switchers, and generally include at least two semiconductor components (e.g., diodes or transistors) and at least one energy storage component (e.g., capacitors or inductors).

At present, buck converters based on the Constant On Time (COT) architecture may be implemented based on an extension of the hysteresis control architecture, which is a simple system structure with good transient response, that is suitable for high frequency and small duty period, and having performance that can well meet the high response requirements of applications such as the power supply of an application processor. However, when a SOC system is on standby, especially when it is battery-powered, the power consumption of a converter is critical for the standby time.

SUMMARY

The present disclosure provides a method for controlling a buck converter. The method includes monitoring an inductor current flowing through an inductor in the buck converter. The method includes controlling the buck converter to operate in a pulse frequency modulation (PFM) mode with intermittent conduction if the inductor current experiences a plurality of cross-zero periods. The method further includes adjusting a power consumption of a component in the buck converter according to the plurality of cross-zero periods of the inductor current, when the buck converter is operating in the PFM mode.

DETAILED DESCRIPTION

The following embodiments of the present disclosure are illustrated by specific concrete examples, and other advantages and benefits of the present disclosure can be readily understood by those skilled in the art as disclosed herein. The present disclosure may also be implemented or applied by different specific embodiments, and the details in this specification may be modified or changed in various ways based on different views and applications without departing from the spirit of the present disclosure. It is to be noted that the following embodiments and the features in the embodiments may be combined with each other without conflict.

It should be noted that the illustrations provided in the following examples illustrate the basic ideas of the present disclosure in a schematic manner only, so that the illustrations show only the components related to the present disclosure and not the number, shape and size of the components in actual implementation, and the shape, number and proportion of the components in actual implementation may be an arbitrary change, and the layout of the components may be more complex. In addition, in this document, relationship terms such as "first", "second", etc. are used only to distinguish one entity or operation from another and do not necessarily require or imply the existence of any such actual relationship or order between these entities or operations. relationship or order between these entities or operations.

When the power consumption of a buck converter is high, it may lead to a shortened standby time for a device that is equipped with such a buck converter, especially for devices equipped with a System-on-Chip (SoC). In addition, for a buck converter implemented with the Constant-On-Time (COT) architecture, the buck converter is expected to operate with an ultra-low power consumption.

In some embodiments of the present disclosure, a technical solution for controlling a buck converter is to utilize a multi-stage (or segmented) power consumption control strategy, thereby allowing the buck converter to become an ultra-low power product while maintaining a fast response. There may be three approaches to reduce a buck converter's power consumption and improve its conversion efficiency. The first approach is by reducing the conduction loss, mainly by reducing the conduction impedance of the power switch. The second approach is by reducing the switching losses, mainly by reducing the equivalent input capacitance of the power switch, by reducing the parasitic capacitance of the power node, or by reducing the dead time of the power switch. And the third approach is by directly reducing the bias power consumption of the key modules on the control loop of the buck converter. The power consumption control strategy according to the present disclosure may involve the second and third approaches for reducing power consumption, mainly to improve the conversion efficiency of the buck converter when operating at low light loads. In this way, the technical solution is able to reduce the power consumption of the buck converter and thus extend the standby time of the device.

In the following, specific embodiments of the present disclosure may be described by exemplary embodiments with reference to the accompanying drawings.

Figure 1A:
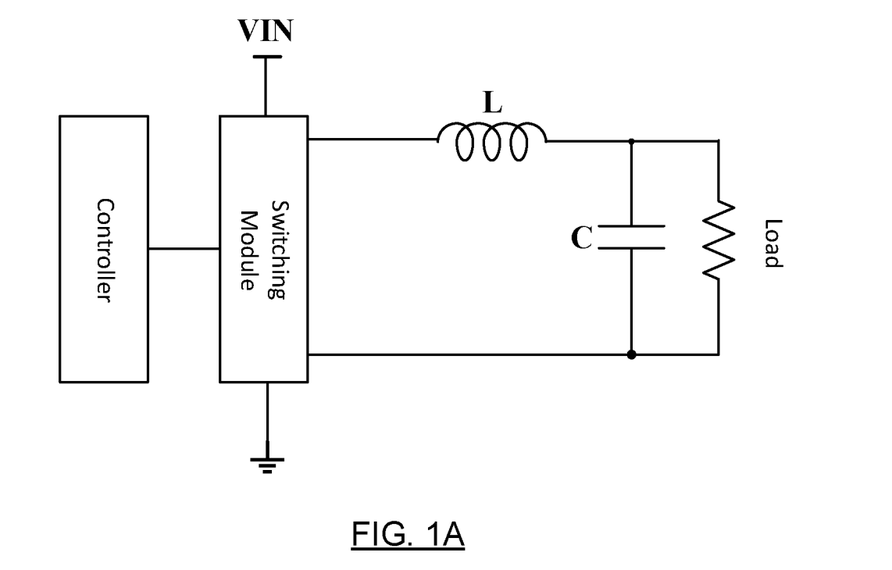
FIG. 1A shows a schematic diagram illustrating a system for controlling and adjusting the power consumption of a buck converter.

FIG. 1A is a schematic diagram illustrating a system for controlling and adjusting the power consumption of a buck converter, according to certain embodiments of the present disclosure. As shown in FIG. 1A, the system may include a controller and a buck converter. The buck converter may include a power supply VIN, an inductor L, a capacitor C, a load, and a switching module. The controller may be configured to perform the following controlling and adjusting operations, including but not limited to: monitoring an inductor current flowing through the inductor in the buck converter; controlling the buck converter to operate in a Discontinuous Conduction Mode (DCM) under a Pulse Frequency Modulation (PFM) mode, if the inductor current experiences multiple cross-zero periods; adjusting the power consumption of the components in the buck converter according to the inductor current cross-zero periods when the buck converter is operating in the PFM mode.

In some embodiments, as shown by the above description, when the inductor current undergoes multiple cross-zero periods, the controller may control the buck converter to operate in the DCM of the PFM mode, so that the power consumption of the buck converter may be reduced. Furthermore, when the buck converter operates in the PFM mode, the controller may adjust the power consumption of the components in the buck converter according to the inductor current cross-zero periods, thereby further reducing the power consumption of the buck converter.

In some embodiments, the controller may perform the controlling and adjusting of the buck converter by: controlling the buck converter to operate in a Continuous Conduction Mode (CCM) under a Pulse Width Modulation (PWM) mode, if the inductor current experiences multiple non-zero periods.

Figure 1B:
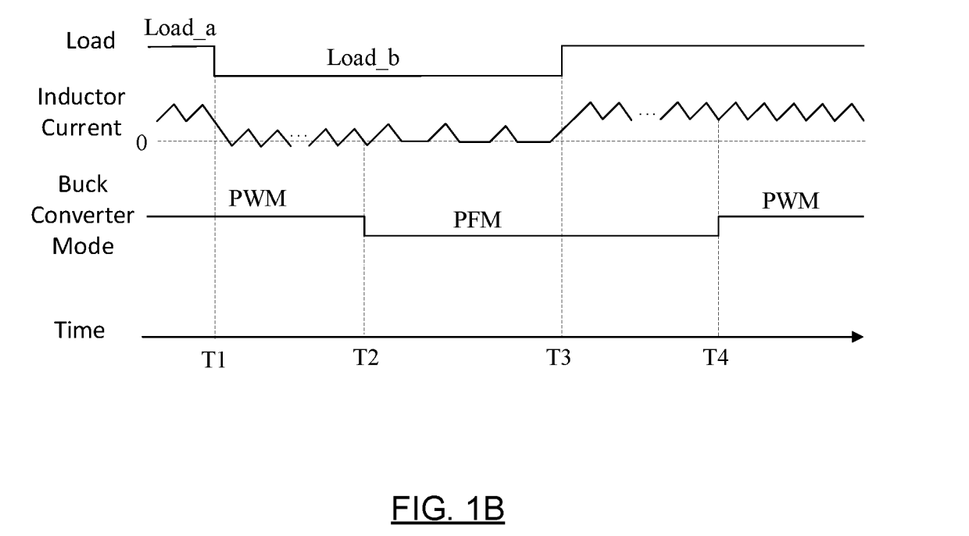
FIG. 1B shows an example diagram of buck converter operation mode switching.

FIG. 1B shows an example diagram of buck converter operation mode switching, according to certain embodiments of the present disclosure. As shown in FIG. 1B, before a specific moment T1, the buck converter may be at a high load Load_a, indicating that the inductor current is not in a cross-zero state. In this case, the controller may configure the buck converter to operate in a PWM mode with continuous conduction. At the specific moment T1, the load of the buck converter may drop to a low load Load_b, which may lead to the drop of inductor current. After the T1 moment, the inductor current may be in a cross-zero state. For any moment T between T1 and T2, the controller may still configure the buck converter to operate in PWM mode with continuous conduction, because the number of cross-zero states the inductor current may be in from the time period T1 to T may be less than a first predetermined value.

In some embodiments, for any moment T after the moment T2, the number of cross-zero states the inductor current may be in from the time period T1 to T may be greater than or equal to the first predetermined value, and the controller may configure the buck converter to operate in PFM mode with intermittent conduction. At the moment T3, the load of the buck converter may rise from Load_b to Load_a, causing the inductor current to rise and no longer in any cross-zero state. At any moment T from the time period T3 to T4, the controller may still configure the buck converter to operate in the PFM mode with intermittent conduction, because the number of cross-zero states the inductor current is in from the time period T3 to T may be less than a second predetermined value. Finally, at any moment T after T4, the controller may configure the buck converter to operate in PWM mode with continuous conduction, because the number of cross-zero states the inductor current is in from the time period T3 to T may be greater than or equal to the second predetermined value.

In some embodiments, the system (or the controller) may adjust the power consumption of a component in the buck converter according to cross-zero periods of the inductor current. Specifically, the system may reduce the power consumption of the component based on a length of time elapsed after a specific cross-zero period in the inductor current occurred, the length of time being less than the interval between the specific cross-zero period and an adjacent cross-zero period of the inductor current.

In some embodiments, the system may adjust the power consumption of a component in the buck converter according to cross-zero periods of inductor current by: controlling the component to operate in a normal mode during the specific cross-zero period of the inductor current. The specific cross-zero period may include a rising phase or a falling phase of the inductor current. The system may control the component to operate in a low-power mode when the inductor current remains at a zero state.

Figure 1C:
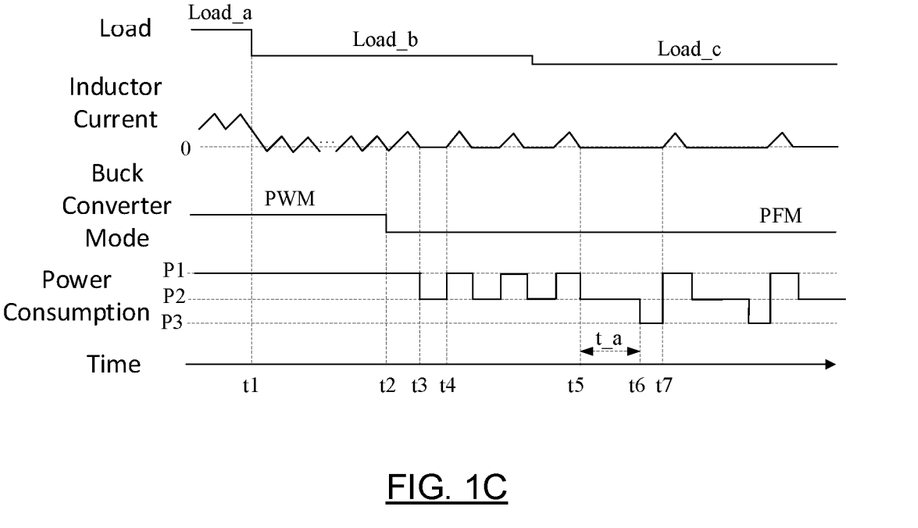
FIG. 1C shows an example graph of multiple power consumption modes for a specific component over time.

FIG. 1C shows an example graph of multiple power consumption modes for a specific component over time, in accordance with certain embodiments of the present disclosure. As shown in FIG. 1C, when the inductor current is in a rising phase or a falling phase, the specific component may operate in a normal mode to ensure that the component responds quickly to changes in loads. When the inductor current is in a zero state, this specific component may operate in a low power mode to minimize the power consumption of the buck converter. For example, during the time period from t2 to t3, the inductor current is in the rising or falling phase, the specific component may be operating in normal mode and its power consumption may be P1. At t4, the inductor current enters the zero state. In this case, the component may be configured to operate in low power mode and its power consumption may become P2, with P1>P2.

In some embodiments, the system may control the specific component to operate in the low power mode by: adjusting the operating mode of the specific component to a first low power mode when the inductor current enters a zero state from a falling phase; adjusting the operating mode of the specific component to a second low power mode when the specific component operates in the first low power mode for a time period longer than a first preset time duration. Specifically, the power consumption of the specific component operating in the second low power mode may be lower than the power consumption in the first low power mode. The first preset time duration may be configurable according to actual requirements.

For example, as shown in FIG. 1C, when the load of the buck converter drops from Load_b to Load_c, the time when the inductor current is in a zero state may be further increased. At moment t5, the inductor current enters the zero state from the falling phase, after which the specific component may operate in a first low-power mode with a power consumption of P2. At moment t6, the specific component may operate in the first power mode for a duration equal to the first preset duration t_a, Afterward, the specific component may enter a second low-power mode with a power consumption of P3 having P3<P2. At moment t7, the inductor current starts to rise, and the specific component may enter a normal power mode with a power consumption of P1. Based on the above approach, the power consumption of the specific component is further reduced.

In some embodiments, the system may control the specific component to operate in a low power mode by: when the specific component responds to a zero-crossing period of the inductor current, and returns from the second low power mode to the normal mode and subsequently to the first low power mode, and when the specific component enters the first low power mode for a duration that is longer than the second preset duration, adjusting the specific component's operating mode to the second low power mode. And the above mentioned second preset duration is less than the first preset duration. The first preset duration and the second preset duration may be adjusted according to actual needs, and the difference between the two preset durations may represent the size of the detection hysteresis to enter the second stage of power reduction.

Figure 1D:
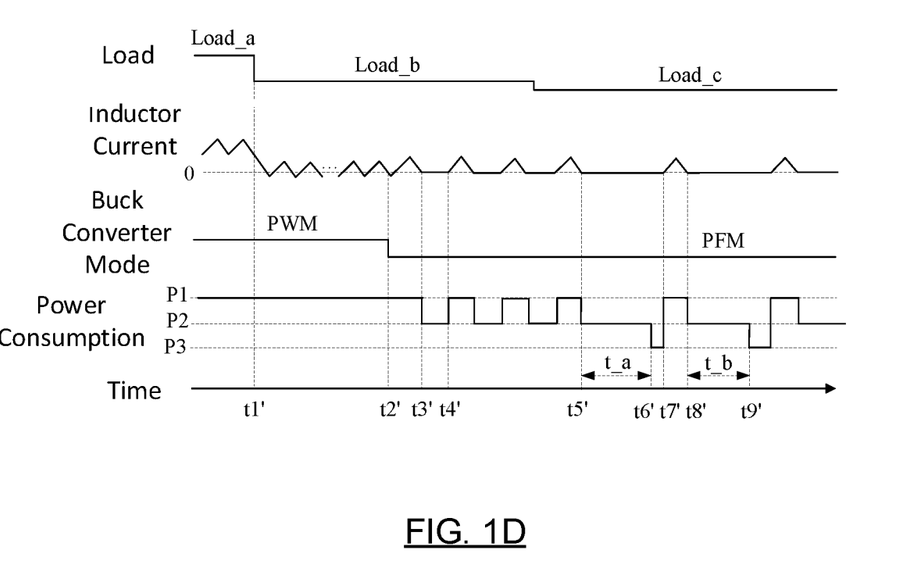
FIG. 1D shows an example graph of switching among multiple power consumption modes for the components over time.

FIG. 1D shows an example graph of switching among multiple power consumption modes for the components over time, in accordance with certain embodiments of the present disclosure. As shown in FIG. 1D, when the load of the buck converter drops from Load_b to Load_c, the duration when the inductor current is in a zero state may be further increased. At the moment t5', the inductor current may be detected to be cross-zero, at which point the specific component may be configured to operate in the first low power mode. At the moment t6', the inductor current may be detected to be cross-zero for a duration equal to the first predetermined duration t_a, at which point it is determined that the buck converter may be in a light load state. During the cross-zero period at t6', based on the first preset duration t_a, the system may determine whether a second stage of power reduction is required, i.e., when the inductor current may be in the zero state for a time equal to the first preset duration t_a, and may control the specific component to enter a second low-power mode.

Once it is determined that the buck converter is currently in a light load state, in the next cross-zero period after t6', the system may configure the buck converter to enter the second stage of power reduction based on the second preset duration t_b. Specifically, when the inductor current is in a zero state for a time equal to the second preset duration t_b, the specific component is configured to enter the second low power mode. Since the cross-zero duration of the inductor current can indicate the load of the buck converter, the above process can be seen as a period-by-period process of adjusting the power consumption of the component including load detection, which can control the buck converter to adjust from first stage power reduction to second stage power reduction in a hysteresis manner when the load drops.

In some embodiments, the first preset duration t_a may be configured to be greater than the second preset duration t_b when determining whether the buck converter is currently in a light load state, and the difference between the two preset durations t_a–t_b, can represent the detection hysteresis of the transition from the first low power mode to the second low power mode. Such hysteresis may be designed to improve the anti-interference ability of the buck converter.

In some embodiments, the system may adjust the power consumption of the component in the buck converter according to the inductor current's cross-zero duration by: in response to the inductor current's cross-zero duration, after the specific component operating mode returns from the second low power mode to the normal mode and subsequently enters into the first low power mode, when the specific component operates in the first low power mode for a duration that is less than the second predetermined duration, adjusting the operating mode of the specific component to the normal mode. In this case, no second stage of power reduction is performed.

Figure 1E:
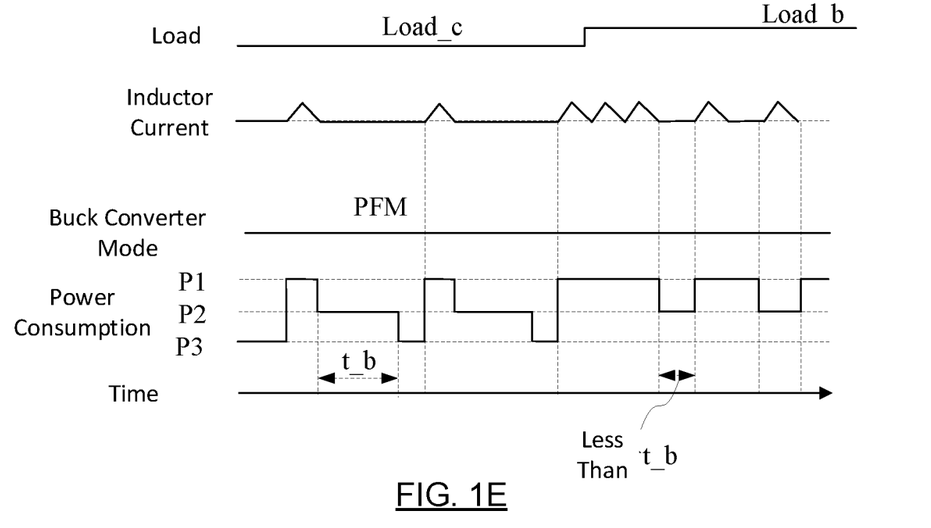
FIG. 1E shows an example graph of the switching between two power consumption modes for a component over time.

FIG. 1E shows an example graph of the switching between two power consumption modes for a component over time, in accordance with certain embodiments of the present disclosure. As shown in FIG. 1E, when the load on the buck converter increases and causes the inductor current to cross zero for a duration less than the second preset duration t_b, the buck converter may be configured to directly exit the second low power mode and return to the normal mode.

In some embodiments, the system may configure the component to operate in a low power mode by: when the component operates in the second low power mode for a period that is longer time than a third predetermined time, adjusting the operating mode of the component to a third low power mode, and the power consumption of the component when operating in the third low power mode is lower than the power consumption of the second low power mode. In this way, the buck converter may be configured with a three-stage power reduction, so as to further reduce its power consumption.

In some embodiments, after the component subsequently enters the second low power mode, when the component operates in the second low power mode for a period that is longer time than a fourth preset time, the system may adjust the operating mode of the component to the third low power mode, and the fourth preset time being less than the third preset time.

It should be noted that the above two-stage power reduction and three-stage power reduction schemes may be two exemplary implementations of the present disclosure, and the present disclosure is not limited to them. In practice, a N-stage power reduction scheme can be used to reduce the power consumption of the buck converter according to specific needs, where N is a positive integer greater than 1. Preferably, when the load drops and causes the buck converter to go from n-stage power mode to n+1-stage power mode, the buck converter can be configured in a hysteresis manner to adjust from n-stage power mode to n+1-stage power mode in a manner similar to that shown in FIG. 1D. In this way, the detection of the current load and the different stages of power reduction can be achieved step by step and period by period. In the above case, n may be a positive integer less than N.

In some embodiments, the design for detection hysteresis of the inductor current may be implemented according to the system requirements, so that the on-time TON_PWM of the buck converter operating in PWM mode may be smaller than the on-time TON_PFM of the buck converter operating in PFM mode. Specifically, the load switching point of the buck converter switching from PWM mode to PFM mode may be smaller than the load switching point for switching from PFM mode to PWM mode, so as to improve the anti-interference capability of mode switching.

In some embodiments, the specific component may be circuitry in the buck converter that is associated with load monitoring. When the component is in a normal mode, this component may be capable of responding quickly to changes in load. When the component is in a low power mode, the speed of responding to changes in load by the component may decrease, and the lower the power consumption of the component, the lower the speed of its response to changes in load. However, the power consumption of the component may also decrease.

In some embodiments, the specific component may include a comparator. And the system may adjust the power consumption of this component according to the cross-zero period of the inductor current by: adjusting the bias current of the comparator according to the cross-zero period of the inductor current. Specifically, assuming that the bias current of the component is Ib_nor, when the component is operating in normal mode, the component may be adjusted to operate in low power mode by reducing the bias current of the component to Ib_Ip, and the component may be adjusted back to operate in normal mode by setting its bias current to Ib_nor, where Ib_Ip<b_nor. The specific value for Ib_Ip can be adjusted according to the actual demand.

Figure 2:
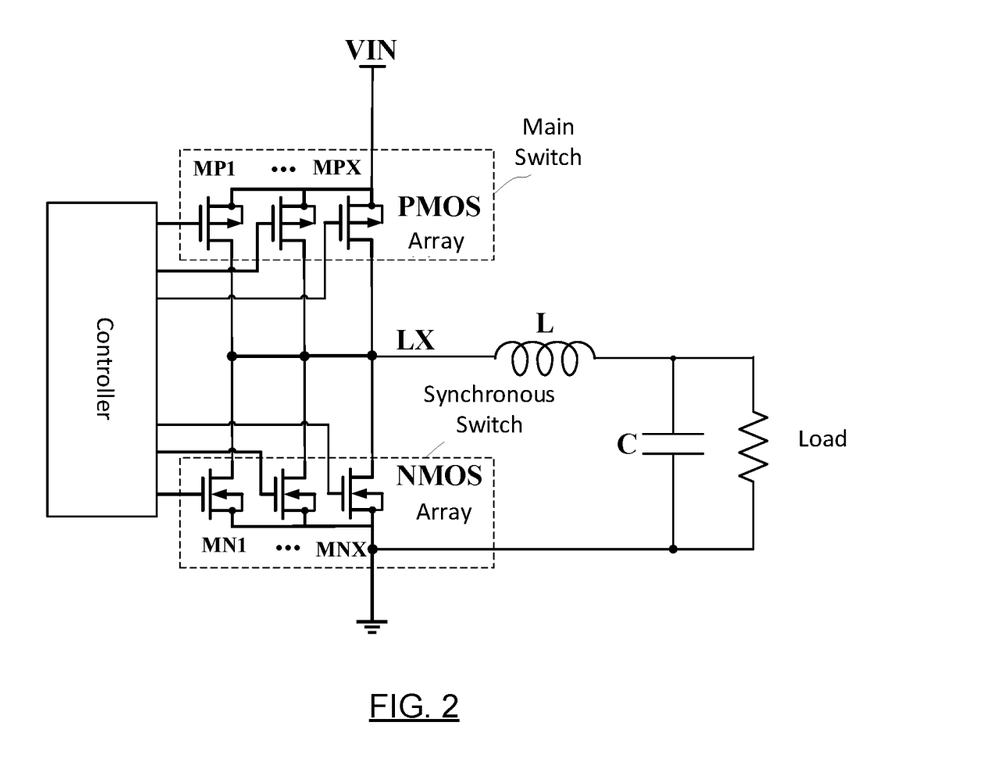
FIG. 2 shows a schematic diagram of the structure of the buck converter.

FIG. 2 shows a schematic diagram of a structure of the buck converter, in accordance with certain embodiments of the present disclosure. As shown in FIG. 2, the switching module of the buck converter may include a main switch (or high-side switch) and a synchronous switch (or low-side switch). The main switch may include a MOS array having multiple first MOS transistors connected in parallel with each other. And the synchronous switch may include a MOS array having multiple second MOS transistors connected in parallel with each other. The first MOS transistors may preferably be P-channel MOS transistors, and the second MOS transistors may preferably be N-channel MOS transistors.

In some embodiments, the system may further adjust the number of the first MOS transistors and/or the second MOS transistors in an operating state according to the operating mode of the buck converter. Specifically, when the buck converter operates in PWM mode with continuous conduction, its efficiency depends mainly on the conduction losses. In this case, by increasing the number of the first MOS transistors and/or the second MOS transistors in operation, it may be beneficial to reduce the conduction impedance and thus improve the conversion efficiency of the buck converter. When the buck converter operates in PFM mode with intermittent conduction, its efficiency depends in large part on switching losses. In this case, by reducing the number of the first MOS transistors and/or the second MOS transistors in operation, it may help to reduce the switching losses and thus improve the conversion efficiency of the buck converter.

In some embodiments, the system may adjust the number of the first MOS transistors and/or the second MOS transistors in the operating state according to the operating mode of the buck converter. Specifically, the system may control all of the first MOS transistors and the second MOS transistors to be in the operating state when the buck converter is operating in PWM mode with continuous conduction; and control part of the first MOS transistors and part of the second MOS transistors to be in the operating state when the buck converter is operating in PFM mode with intermittent conduction.

Figure 3:
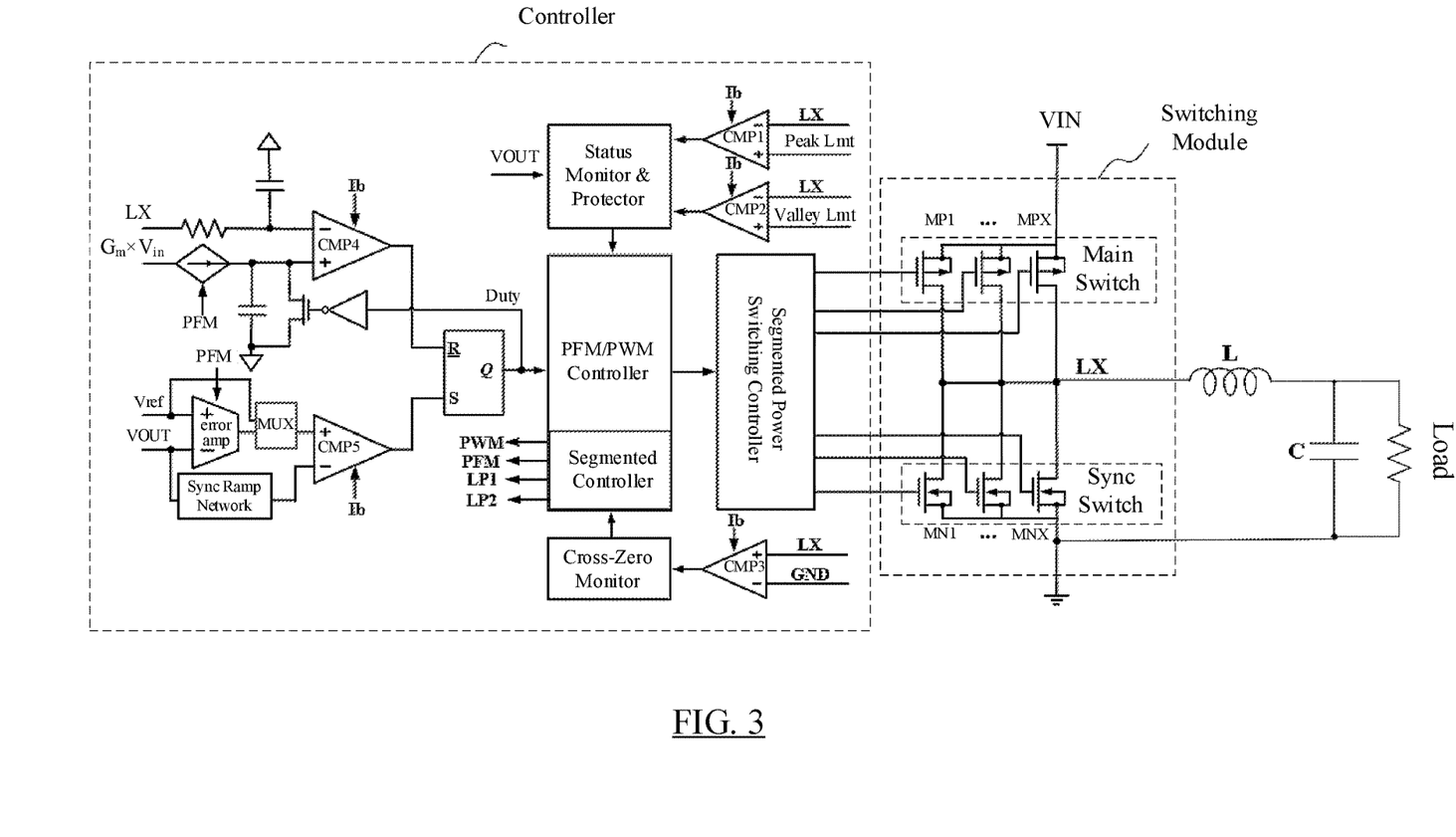
FIG. 3 shows an example circuit diagram of the buck converter based on the COT architecture.

In some embodiment, the above controlling operations may be applied to a buck converter based on a COT architecture. FIG. 3 illustrates an example circuit diagram of the buck converter based on the COT architecture, according to certain embodiments of the present disclosure. As shown in FIG. 3, the buck converter may include a controller, a switching module, a power supply, an inductor L, and a capacitor C. The components in the buck converter may include a peak current limiting comparator CMP1, a valley current limiting comparator CMP2, a cross-zero comparator CMP3, a COT comparator CMP4, and/or a PWM comparator CMP5, etc. The power consumption of these comparators may be adjusted by a bias current Ib. The above control operation can ensure that the buck converter based on COT architecture can meet the fast response requirement while adapting to the ultra-low power product requirement.

In some embodiments, the COT turned-on time of the buck converter in PWM mode may be set to K times of the COT turned-on time of the buck converter in PFM mode. The above configuration can be achieved by reducing $G_m \times V_{in}$, where K<1, $G_m$ being the trans-conductance of the buck converter, and $V_{in}$ being the input voltage of the buck converter. This setting can ensure that the exit load of the PWM mode is smaller than the entry load of the PFM mode, so as to improve the anti-load ripple interference capability of the buck converter and avoid the buck converter from switching back and forth between PWM mode and PFM mode.

Figure 4:
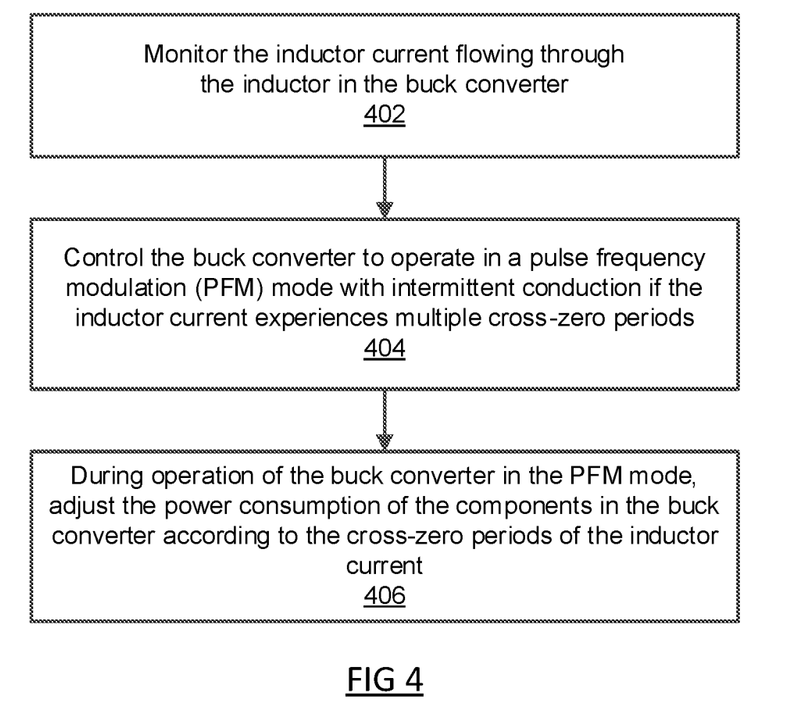
FIG. 4 shows a flow chart illustrating a method for controlling a buck converter.

FIG. 4 shows a flow chart illustrating a method for controlling a buck converter, according to certain embodiments of the present disclosure. As shown in FIG. 4, the method includes the following operations 402 to 406.

At operation 402, the system may monitor the inductor current flowing through the inductor in the buck converter.

At operation 404, the system may control the buck converter to operate in a pulse frequency modulation (PFM) mode with intermittent conduction if the inductor current experiences multiple cross-zero periods.

At operation 406, during operation of the buck converter in the PFM mode, the system may adjust the power consumption of the components in the buck converter according to the cross-zero periods of the inductor current.

In addition, in some embodiments, the method may also include additional operations or actions of the control method performed by the aforementioned controller, the detailed description of which is shown above.

According to the embodiments of the present disclosure, a control scheme for buck converter applicable to COT architecture is proposed to achieve efficient control techniques for wide range of output loads. By maintaining the conventional COT architecture while having simpler structure and faster response, the above segmented and multi-mode efficient control strategy may be applicable for different loads of the buck converter by using different operating modes, thereby greatly improved the conversion efficiency of the buck converter and extended its practical application range.

According to another aspect of the present disclosure, an apparatus for controlling a buck converter may be provided. This apparatus may include a controller, such controller being the aforementioned controller described with reference to FIGS. 1A to 1D, FIG. 2 and FIG. 3. Furthermore, the controller may be configured to control the buck converter by using the method according to FIG. 4.

Figure 5:
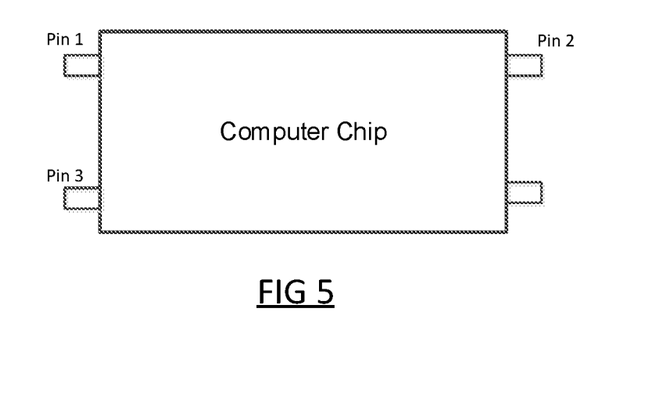
FIG. 5 shows a schematic diagram of the structure of a chip, all according to certain embodiments of the present disclosure.

According to another aspect of the present disclosure, a chip may also be provided. The chip may include a device and a buck converter according to the embodiments described in the present disclosure, referring, for example, to FIG. 5, in which a schematic diagram of one structure of the chip is shown.

The foregoing embodiments are merely illustrative of the principles of the present disclosure and its efficacy, and are not intended to limit the present disclosure. Any person skilled in the art may modify or alter the foregoing embodiments without departing from the spirit and scope of the present disclosure. Accordingly, all equivalent modifications or changes made by persons having ordinary knowledge in the art, without departing from the spirit and technical ideas disclosed in this disclosure, shall still be covered by the claims of this disclosure.

What is claimed is:

1. A method for controlling a buck converter, comprising:
monitoring an inductor current flowing through an inductor in the buck converter;
controlling the buck converter to operate in a pulse frequency modulation (PFM) mode with intermittent conduction if the inductor current experiences a plurality of cross-zero periods; and
adjusting a power consumption of a component in the buck converter according to the plurality of cross-zero periods of the inductor current, when the buck converter is operating in the PFM mode.

2. The method of claim 1, further comprising:
controlling the buck converter to operate in a pulse width modulation (PWM) mode with continuous conduction if the inductor current experiences a plurality of non-zero periods.

3. The method of claim 2, further comprising:
controlling the buck converter such that a first load switching point of the buck converter for switching from the PWM mode to the PFM mode is less than a second load switching point for switching from the PFM mode to the PWM mode.

4. The method of claim 1, wherein the adjusting of the power consumption of the component in the buck converter comprises:
reducing the power consumption of the component according to a length of time elapsed after one cross-zero period of the inductor current, the length of time being less than an interval between the cross-zero period and an adjacent cross-zero period of the inductor current.

5. The method of claim 1, wherein the adjusting of the power consumption of the component in the buck converter comprises:
controlling the component to operate in a normal mode during the cross-zero period of the inductor current, the cross-zero period comprising a rising phase or a falling phase of the inductor current; and
controlling the component to operate in a low power consumption mode during a period when the inductor current is held at a zero state.

6. The method of claim 5, wherein the controlling of the component to operate in the low power consumption mode comprises:
adjusting an operating mode of the component to a first low-power consumption mode when the inductor current enters the zero state from the falling phase; and
adjusting the operating mode of the component to a second low-power consumption mode when the component operates in the first low-power consumption mode for a longer duration than a first preset length of time, wherein power consumption of the component when operating in the second low-power mode is lower than power consumption of the component when operating in the first low-power mode.

7. The method of claim 6, wherein the controlling of the component to operate in the low power consumption mode further comprises:
adjusting the operating mode of the component to the second low power consumption mode when the component operates in the first low power consumption mode for a longer duration than a second preset length of time, after the component returns from the second low power consumption mode to the normal mode in response to the cross-zero period of the inductor current and subsequently enters the first low power consumption mode, the second preset length of time being less than the first preset length of time.

8. The method of claim 7, wherein the adjusting of the power consumption of the component in the buck converter further comprises:
adjusting the operating mode of the component to the normal mode when the component operates in the first low power consumption mode for a less duration than the second preset length of time, after the component returns from the second low power consumption mode to the normal mode in response to the cross-zero period of the inductor current and subsequently enters the first low-power consumption mode.

9. The method of claim 6, wherein the controlling of the component to operate in the low power consumption mode further comprises:
adjusting the operating mode of the component to a third low power consumption mode when the component operates in the second low power consumption mode for a longer duration than a third preset length of time, the power consumption of the component when operating in the third low power-consumption mode is lower than the power consumption of the component when operating in the second low power mode.

10. The method of claim 9, wherein the controlling of the component to operate in the low power consumption mode further comprises:
adjusting the operating mode of the component to the third low-power consumption mode when the component operates in the second low power consumption mode for a longer duration than a fourth preset length of time after the component enters the second low-power consumption mode, the fourth preset length of time being less than the third preset length of time.

11. The method of claim 1, wherein the component comprises a comparator, and wherein the adjusting of the power consumption of the component comprises:
adjusting a bias current of the comparator according to the cross-zero period of the inductor current.

12. The method of claim 1, wherein the buck converter comprises a main switch and a synchronous switch, the main switch comprises a plurality of first MOS transistors connected in parallel with each other, the synchronous switch comprises a plurality of second MOS transistors connected in parallel with each other, the method further comprising:
adjusting numbers of the first MOS transistors and/or the second MOS transistors in operating states according to an operating mode of the buck converter.

13. The method of claim 12, wherein the adjusting of the numbers of the first MOS transistors and/or the second MOS transistors in operating states comprises:
controlling all of the first MOS transistors and all of the second MOS transistors in the operating state when the buck converter is operating in a pulse width modulation (PWM) mode with continuous conduction; and
controlling a portion of the first MOS transistors and a portion of the second MOS transistors in the operating state when the buck converter operates in the PFM mode with intermittent conduction.

14. A device for controlling a buck converter, comprising a controller, wherein the controller is configured to:
monitor an inductor current flowing through an inductor in the buck converter;
control the buck converter to operate in a pulse frequency modulation (PFM) mode with intermittent conduction if the inductor current experiences a plurality of cross-zero periods; and adjust a power consumption of a component in the buck converter according to the plurality of cross-zero periods of the inductor current, when the buck converter is operating in the PFM mode.

15. The device of claim 14, wherein the controller is further configured to:
control the buck converter to operate in a pulse width modulation (PWM) mode with continuous conduction if the inductor current experiences a plurality of non-zero periods.

16. The method of claim 14, wherein the controller adjusts the power consumption of the component in the buck converter by:
reducing the power consumption of the component according to a length of time elapsed after one cross-zero period of the inductor current, the length of time being less than an interval between the cross-zero period and an adjacent cross-zero period of the inductor current.

17. The method of claim 14, wherein the controller adjusts the power consumption of the component in the buck converter by:
controlling the component to operate in a normal mode during the cross-zero period of the inductor current, the cross-zero period comprising a rising phase or a falling phase of the inductor current; and
controlling the component to operate in a low power consumption mode during a period when the inductor current is held at a zero state.

18. A chip, comprising:
a buck converter comprising a component and an indicator; and
a controller,
wherein the controller is configured to:
monitor a inductor current flowing through the inductor;
control the buck converter to operate in a pulse frequency modulation (PFM) mode with intermittent conduction if the inductor current experiences a plurality of cross-zero periods; and
adjust a power consumption of the component according to the plurality of cross-zero periods of the inductor current, when the buck converter is operating in the PFM mode.

19. The chip of claim 18, wherein the buck converter further comprises a main switch and a synchronous switch, the main switch comprises a plurality of first MOS transistors connected in parallel with each other, the synchronous switch comprises a plurality of second MOS transistors connected in parallel with each other, and the controller is further configured to:
adjust numbers of the first MOS transistors and/or the second MOS transistors in operating states according to an operating mode of the buck converter.

20. The chip of claim 18, wherein the controller adjusts of the numbers of the first MOS transistors and/or the second MOS transistors in operating states by:
controlling all of the first MOS transistors and all of the second MOS transistors in the operating state when the buck converter is operating in a pulse width modulation (PWM) mode with continuous conduction; and
controlling a portion of the first MOS transistors and a portion of the second MOS transistors in the operating state when the buck converter operates in the PFM mode with intermittent conduction.

* * * * *